US007133265B2

(12) United States Patent
Lee

(10) Patent No.: US 7,133,265 B2
(45) Date of Patent: Nov. 7, 2006

(54) AUTOMATIC ANTI-ACCIDENT ELECTRICAL OUTLET

(75) Inventor: Yi Ping Lee, Hsintien (TW)

(73) Assignees: Weng Feng Yu, Taipei (TW); Rui Hong Weng, Taipei Hsien (TW)

( * ) Notice: Subject to any disclaimer, the term of this patent is extended or adjusted under 35 U.S.C. 154(b) by 406 days.

(21) Appl. No.: 10/602,869

(22) Filed: Jun. 25, 2003

(65) Prior Publication Data

US 2004/0264076 A1 Dec. 30, 2004

(51) Int. Cl.
*H02H 3/00* (2006.01)

(52) U.S. Cl. ........................................................ 361/42

(58) Field of Classification Search .................. 361/42; 439/536, 535

See application file for complete search history.

(56) References Cited

U.S. PATENT DOCUMENTS 4,568,997 A * 2/1986 Bienwald et al. ............. 361/45
5,661,623 A * 8/1997 McDonald et al. ........... 361/42
5,757,598 A * 5/1998 Aromin ....................... 361/44
6,125,023 A * 9/2000 Bezek, Sr. ................. 361/93.3

* cited by examiner

*Primary Examiner*—Brian Sircus
*Assistant Examiner*—Boris Benenson
(74) *Attorney, Agent, or Firm*—Rosenberg, Klein & Lee

(57) ABSTRACT

An automatic anti-accident electrical outlet has a main body, a circuit board and an overload protector. The circuit board has insertion rods to be inserted into insertion holes of the main body. Through holes of the circuit board exactly coincide with electric wire insertion holes of the main body so that power can be output through the overload protector by the main body. When the electric current of the electrical outlet is overloaded, the overload protector on the circuit board automatically cuts off the electricity to let the electrical outlet no longer provide power. Moreover, an alarm lamp on the circuit board is illuminated to warn the user of the problem. After the problem has been troubleshot, a function restoration button on the overload protector is pressed to let the electrical outlet provide power again, and the alarm lamp on the circuit board simultaneously is illuminated.

5 Claims, 5 Drawing Sheets

AUTOMATIC ANTI-ACCIDENT ELECTRICAL OUTLET

FIELD OF THE INVENTION

The present invention relates to an automatic anti-accident electrical outlet and, more particularly, to an electrical outlet capable of automatically cutting off the power source to avoid sparking of electric wires and maintain safety in the use of electric appliances when the electric current thereon is overloaded.

BACKGROUND OF THE INVENTION

Nowadays, various kinds of electric appliances have been invented, and bring much convenience and enjoyment to people. Electricity is required for the operation of electric appliances. However, hazards may occur due to breakdown of electric appliances, overload in use, damage of internal components or sparking of electric wires, among which sparking of electric wires is the most dangerous and causes the greatest harm.

Generally, sparking of electric wires results from improper use of electric appliances, common use of the same electrical outlet by several electric appliances, or breakdown of electric appliances. These problems cause an overload of the electric current in the electrical outlet and thus the hazard of sparking of electric wires. The results are catastrophic. Sparking of electric wires can damage the whole circuit system, and may endanger neighbors. In fact, many fires are caused by sparking of electric wires.

Usually, the electrical outlets on the wall of homes, public places and business offices are insufficient. Many people install an extension cord or a multi-electrical outlet in an electrical outlet for use of more electric appliances. Therefore, the electrical outlet bears a large load. When the load exceeds a certain value and the electrical outlet can bear no more, a short circuit or even sparking of electric wires occurs. R.O.C. Pat. No. 413,404 proposes an improved electrical outlet in which an overload protection circuit and a counter are used to cut off the power source when the electric current is overloaded. However, after the overload situation has been obviated, the normal function of power supply cannot be restored, hence causing inconvenience in practical application.

SUMMARY OF THE INVENTION

The primary object of the present invention is to provide an automatic anti-accident electrical outlet, which integrates a main body, a circuit board and an overload protector into an electrical outlet. The circuit board is used for installation of the overload protector and connection between the overload protector and the main body. The circuit board has insertion rods for insertion into insertion holes of the main body. Through holes of the circuit board exactly coincide with electric wire insertion holes of the main body so that power can be output through the overload protector by the main body. When the electric current of the electrical outlet is overloaded, the overload protector on the circuit board automatically cut off the electricity to the electrical outlet. Moreover, an alarm lamp on the circuit board is illuminated to warn the user of the problem.

Another object of the present invention is to provide an automatic anti-accident electrical outlet, by which a function restoration button on the overload protector can be pressed to restore power to the electrical outlet after the abnormal situation has been resolved.

Yet another object of the present invention is to provide an automatic anti-accident electrical outlet, in which the circuit board can be directly installed on the main body of an existent electrical outlet to accomplish the effect of convenient and easy installation without needing to change the type of electrical outlet, damaging the structure of the main body, or replacing existent electrical outlets.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
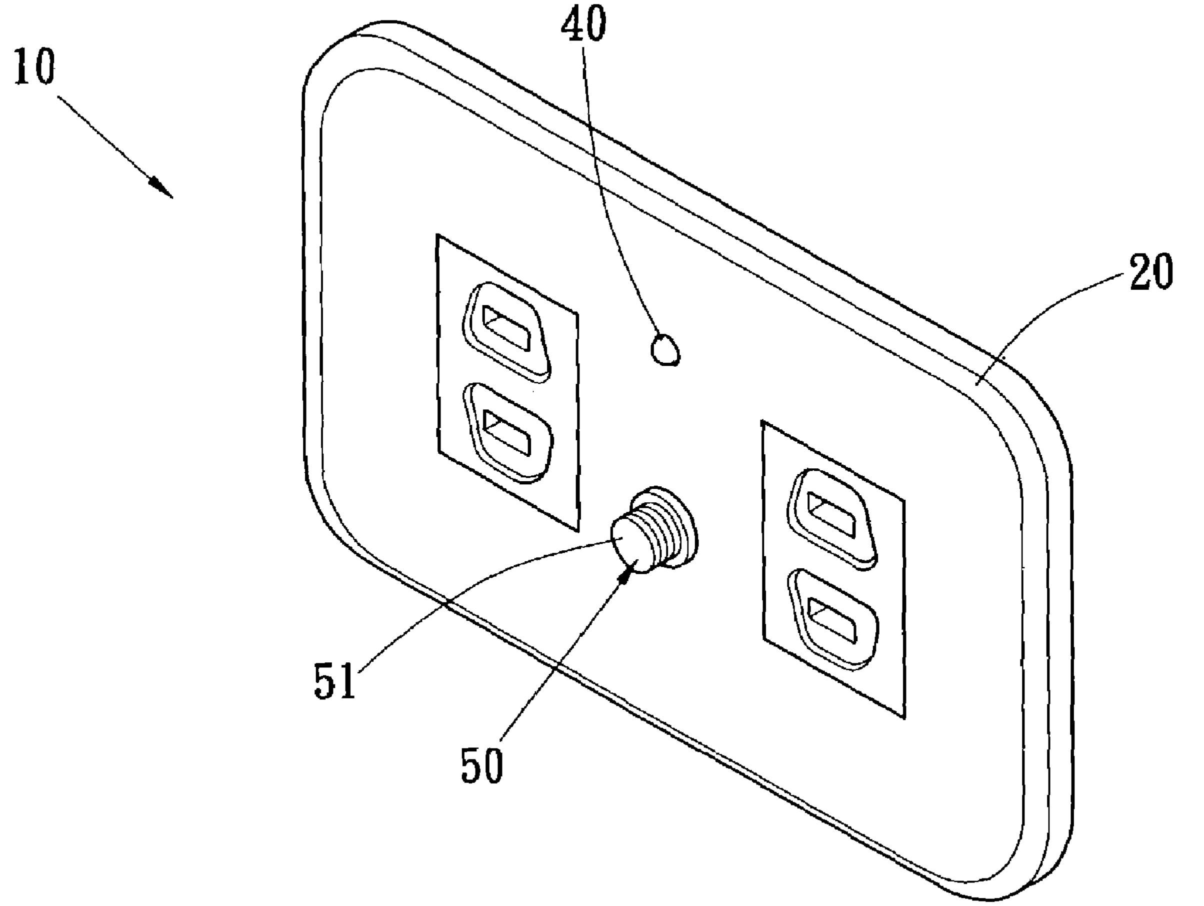
FIG. 1 is a perspective view of the present invention.
Figure 2:
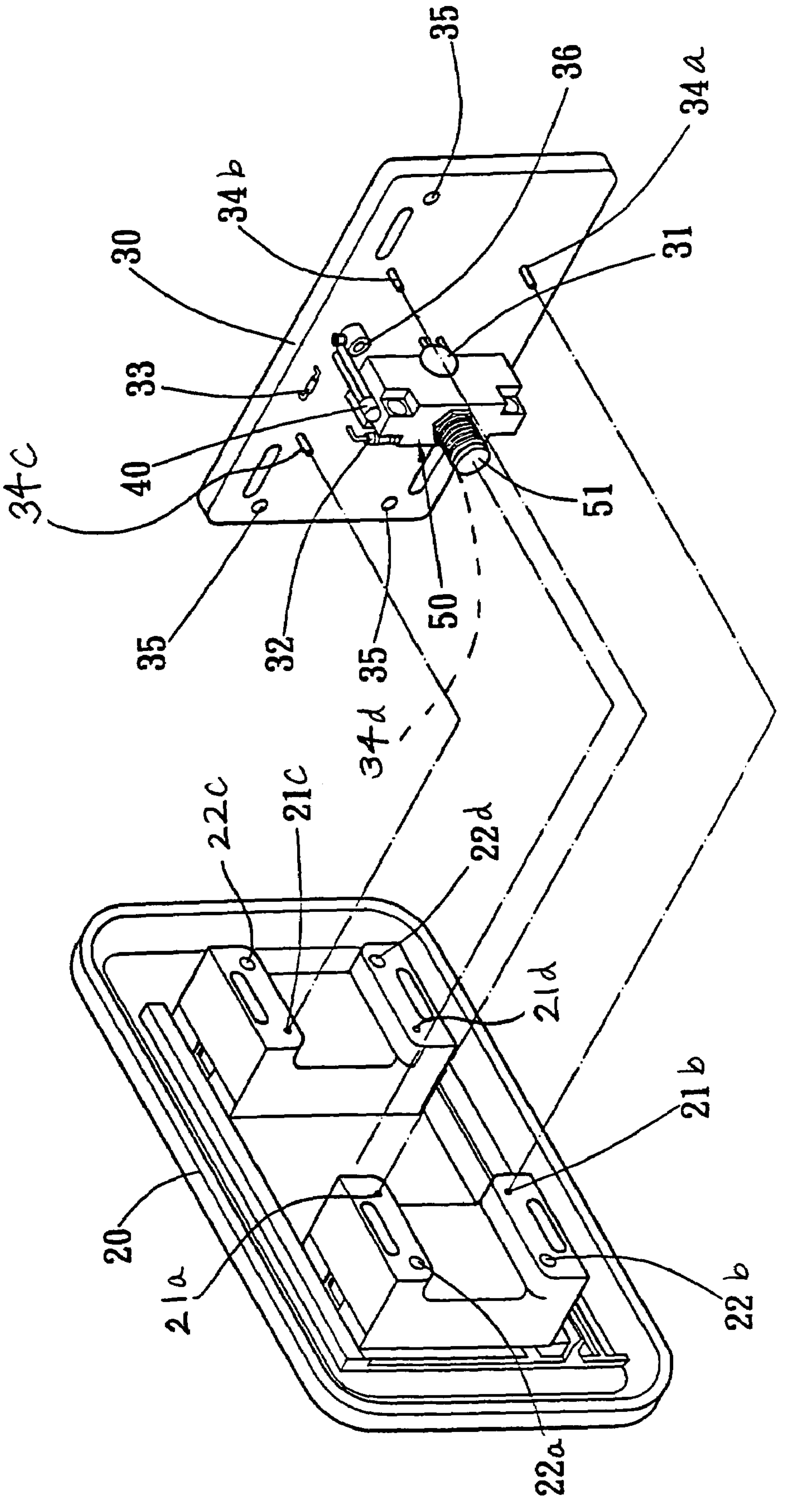
FIG. 2 is an exploded perspective view of the present invention.
Figure 3:
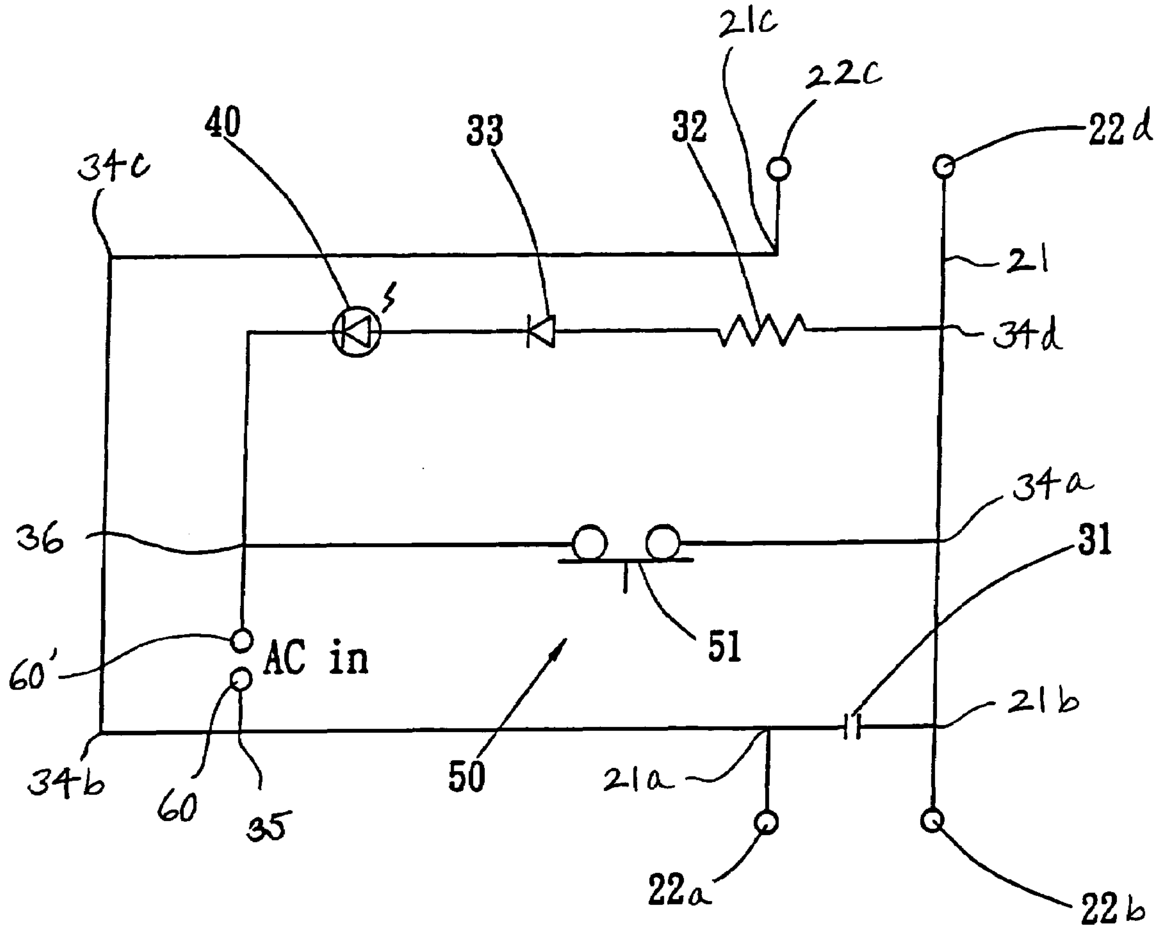
FIG. 3 is a circuit diagram of the circuit board of the present invention.
Figure 4:
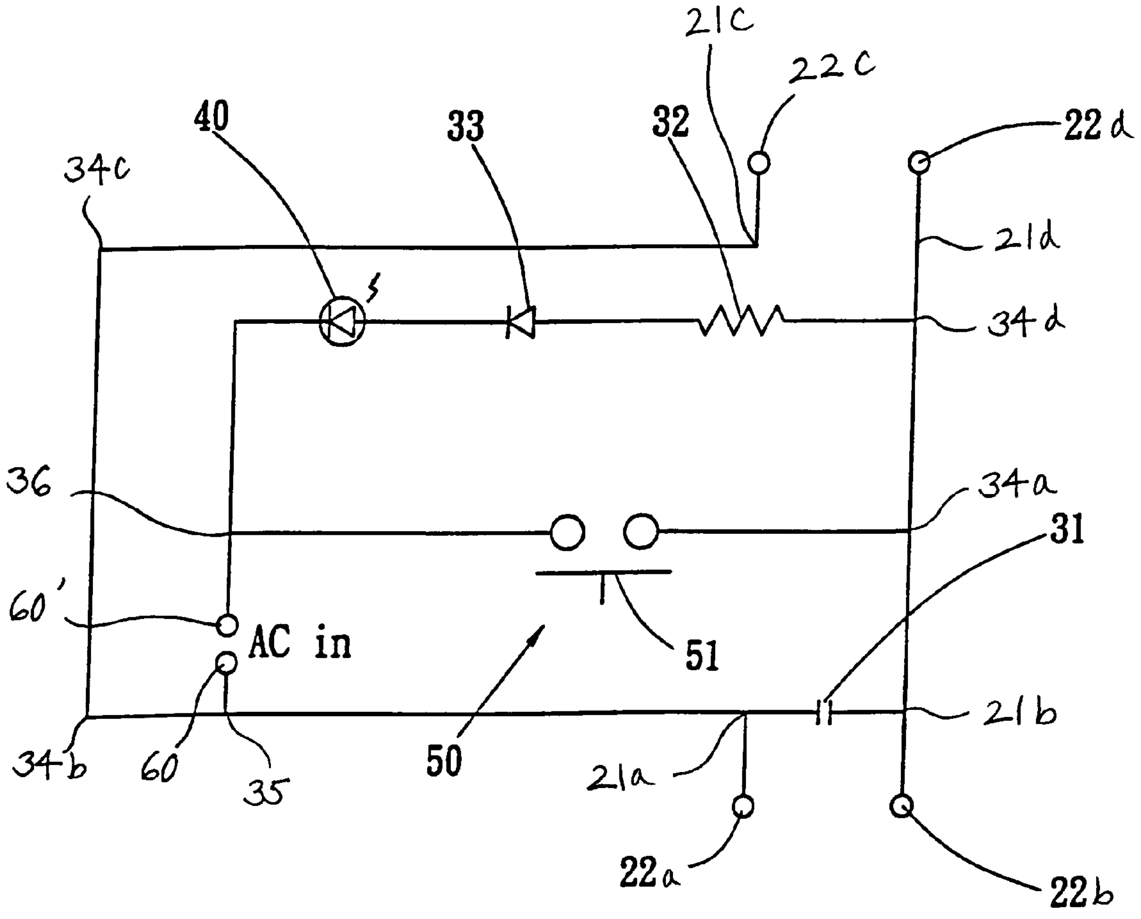
FIG. 4 is another circuit diagram of the circuit board of the present invention.
Figure 5:
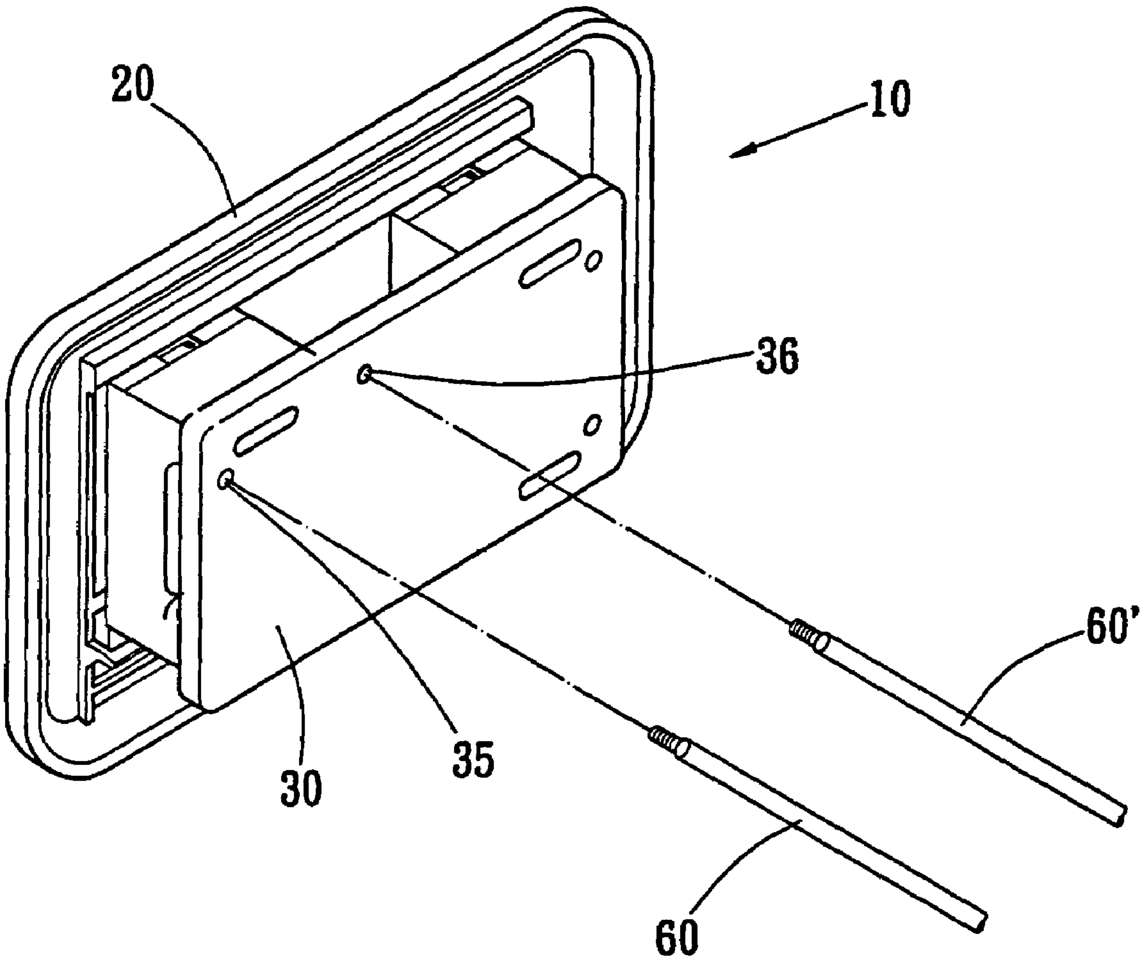
FIG. 5 is a diagram showing the connection between the circuit board and power source wires of the present invention.

As shown in FIGS. 1 and 2, an electrical outlet 10 of the present invention comprises a main body 20, a circuit board 30, an alarm lamp 40 and an overload protector 50. Several insertion holes 21*a–d* and electric wire insertion holes 22*a–d* are provided on the back face of the main body 20. The circuit board 30 is used for connection between the overload protector 50 and the main body 20. A surge capacitor 31, a step-down resistor 32, a rectifying diode 33 and the alarm lamp 40 are installed on the circuit board 30. The overload protector 50 is installed on the circuit board 30 and connected with the components on the circuit board 30. A function restoration button 51 protruding from the main body 20 is also provided on the overload protector 50. Several insertion rods 34 and through holes 35 are provided on the circuit board 30. The insertion rods 34*a–d* on the circuit board 30 are inserted into the insertion holes 21*a–d* of the main body 20. The through holes 35 of the circuit board 30 exactly coincide with the electric wire insertion holes 22*a*–d of the main body 20 to form a circuit between the circuit board and the main body. As shown in FIGS. 3, 4 and 5, one of power source wires 60 passes through one of the through holes 35*a* of the circuit board 30 and is inserted into one of the electric wire insertion holes 22*a* of the main body 20. The other power source wire 60' is inserted into a power source insertion hole 36 of the circuit board 30 to electrify the main body 20 and the circuit board 30. Power is output through the overload protector 50 by the main body 20 for operation of an electric appliance. When the load on the main body 20 is normal, each component on the circuit board 30 operates normally. Once the electric current of the whole electrical outlet 10 is overloaded, the overload protector 50 on the circuit board 30 automatically cuts off the electricity so that electrical outlet 10 is off. Simultaneously, the alarm lamp 40 on the circuit board 30 is illuminated to alert the user to the abnormal situation. After the user has resolved the problem, the function restoration button on the overload protector 50 is pressed to restore power to electrical outlet 10, and the alarm lamp 40 on the circuit board 30 simultaneously turns off.

To sum up, the present invention connects the overload protector and the electrical outlet circuit together. When the electric current used by electric appliances plugged into the electrical outlet is overloaded, the overload protector on the circuit board automatically cuts off the electricity to avoid occurrence of hazards. After the abnormal situation has been resolved, the function restoration button on the overload protector is pressed to let the electrical outlet provide power again.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. An automatic anti-accident electrical outlet comprising:

a main body having a plurality of electric coupling insertion holes and electric wire insertion holes formed in a back face thereof;

a circuit board connected to said main body, a surge capacitor, a step-down resistor and a rectifying diode being installed on said circuit board; and an overload protector installed on said circuit board and connected with components on said circuit board for selectively coupling a source of electric power to said main body, a function restoration button being provided on said overload protector to protrude from said main body;

when an electric current overload of said electrical outlet occurs, said overload protector on said circuit board being operable to cut off said main body from to the electric power and illuminate an alarm lamp on said circuit board, upon the overload situation being resolved, said function restoration button being manipulable to actuate said overload protector to restore coupling of electric power to said main body and deactivate said alarm lamp on said circuit board.

2. The automatic anti-accident electrical outlet as claimed in claim 1, wherein said circuit board has protruding therefrom a plurality of insertion rods inserted into said insertion holes of said main body for electrical coupling, and through holes disposed to align with said electric wire insertion holes of said main body for receiving a power source wire.

3. An automatic anti-accident electrical outlet comprising:

at least one receptacle defining a plurality of socket opening portions for supplying power to an electrical appliance connected thereto, the receptacle having formed in a back face thereof a pair of electric wire insertion holes and a pair of insertion holes, at least one of said socket opening portions being electrically coupled to a first power source wire through one of the electric wire insertion holes, the outlet further comprising:

a main body receiving said receptacle therein;

an overload protector coupled to the main body for selectively coupling a source of electric power thereto, the overload protector having a function restoration button protruding to be exposed outside said main body, said overload protector;

a surge capacitor electrically connecting said socket opening portions;

a step-down resistor having a first end electrically connected to one of said socket opening portions;

a rectifying diode having a positive pole and a negative pole, said positive pole of said rectifying diode electrically connecting to a second end of said step-down resistor; and an alarm lamp exposed outside said main body, said alarm lamp having a positive pole electrically connecting to said negative pole of said rectifying diode, said alarm lamp having a negative pole electrically connecting to said second power source wire;

wherein the overload protector is operable responsive to current overload of said receptacle to cut off electric power thereto and generate current through the surge capacitor, step-down resistor, and rectifying diode for actuating the alarm lamp for visually alerting a user.

4. The automatic anti-accident electrical outlet as claimed in claim 3, comprising a plurality of receptacles each connected to the first power source wire, adjacent ones of said receptacles being spaced one from the other, with said function restoration button and alarm lamp disposed therebetween.

5. The automatic anti-accident electrical outlet as claimed in claim 4, further comprising a circuit board, wherein said overload protector, said surge capacitor, said step-down resistor, said rectifying diode, and said alarm lamp are mounted thereon, said circuit board having four insertion rods respectively inserted into corresponding ones of said insertion holes.

* * * * *